US012057041B2

(12) United States Patent
Hong et al.

(10) Patent No.: US 12,057,041 B2
(45) **Date of Patent: *Aug. 6, 2024**

(54) DISPLAY APPARATUS AND METHOD OF DRIVING THE SAME

(71) Applicant: SAMSUNG DISPLAY CO., LTD., Yongin-si (KR)

(72) Inventors: Seokha Hong, Seoul (KR); Joon-Chul Goh, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,933

(22) Filed: Feb. 6, 2023

(65) Prior Publication Data

US 2023/0186807 A1 Jun. 15, 2023

Related U.S. Application Data

(63) Continuation of application No. 17/537,734, filed on Nov. 30, 2021, now Pat. No. 11,574,568.

(30) Foreign Application Priority Data

Mar. 10, 2021 (KR) ........................ 10-2021-0031607

(51) Int. Cl.
*G09G 3/00* (2006.01)

(52) U.S. Cl.
CPC ..... *G09G 3/006* (2013.01); *G09G 2310/0275* (2013.01); *G09G 2320/041* (2013.01); *G09G 2330/028* (2013.01); *G09G 2330/12* (2013.01)

(58) Field of Classification Search
CPC ............. G09G 3/006; G09G 2320/041; G09G 2330/12; G09G 2310/0275; G09G 2330/028
See application file for complete search history.

(56) References Cited

U.S. PATENT DOCUMENTS

2008/0246702 A1* 10/2008 Lee ...................... G09G 3/3233 345/77
2013/0009939 A1* 1/2013 Ebisuno ............... G09G 3/3233 345/212

(Continued)

FOREIGN PATENT DOCUMENTS

KR 10-0700643 3/2007

OTHER PUBLICATIONS

Notice of Allowance dated Nov. 5, 2022 in corresponding U.S. Appl. No. 17/537,734.

*Primary Examiner* — Hang Lin
(74) *Attorney, Agent, or Firm* — F. Chau & Associates, LLC

(57) ABSTRACT

A display apparatus includes a display panel, a driving controller and a data driver. The driving controller is configured to predict a panel temperature according to a position in the display panel based on input image data, to calculate a block current of a display block of the display panel and a panel resistance according to the position in the display panel based on the panel temperature, to calculate a voltage drop according to the position in the display panel based on the block current and the panel resistance and to compensate the input image data based on the voltage drop to generate a data signal. The data driver is configured to convert the data signal to a data voltage and to output the data voltage to the display panel.

20 Claims, 8 Drawing Sheets

(56) References Cited

U.S. PATENT DOCUMENTS

| | | | | |
|---|---|---|---|---|
| 2017/0132971 | A1* | 5/2017 | Inoue | G09G 3/3233 |
| 2017/0309241 | A1* | 10/2017 | Shin | G09G 3/3677 |
| 2019/0043424 | A1* | 2/2019 | Wang | G09G 3/3241 |
| 2020/0349884 | A1* | 11/2020 | Lai | G09G 3/3208 |
| 2022/0293021 | A1 | 9/2022 | Hong et al. | |

* cited by examiner

DISPLAY APPARATUS AND METHOD OF DRIVING THE SAME

CROSS-REFERENCE TO RELATED APPLICATIONS

This non-provisional patent application is a continuation of U.S. patent application Ser. No. 17/537,734 filed Nov. 30, 2021, which claims priority under 35 U.S.C. § 119 to Korean Patent Application No. 10-2021-0031607, filed on Mar. 10, 2021 in the Korean Intellectual Property Office KIPO, the contents of which are incorporated by reference in their entirety herein.

1. TECHNICAL FIELD

Embodiments of the present inventive concept relate to a display apparatus and a method of driving the display apparatus.

2. DISCUSSION OF RELATED ART

Generally, a display apparatus includes a display panel and a panel driver to drive the display panel. The display panel includes a plurality of gate lines and a plurality of data lines. The display panel driver includes a gate driver and a data driver. The gate driver outputs gate signals to the gate lines. The data driver outputs data voltages to the data lines.

A current-resistance (IR) drop may occur at certain positions in the display panel. Thus, a luminance of the display panel may differ from that desired luminance. The IR drop may be predicted based on a current according to the position in the display panel and the luminance of the display panel may be compensated based on the predicted IR drop. However, a temperature of the display panel may reduce the accuracy of the prediction. Thus, the luminance of the display panel may not be properly compensated.

SUMMARY

At least one embodiment of the present inventive concept provides a display apparatus for calculating an IR drop based on a temperature prediction value according to a position in a display panel to enhance a display quality of the display panel.

At least one embodiment of the present inventive concept also provides a method of driving the display apparatus.

In an embodiment of a display apparatus according to the present inventive concept, the display apparatus includes a display panel, a driving controller and a data driver. The driving controller is configured to predict a panel temperature according to a position in the display panel based on input image data, to calculate a block current of a display block of the display panel and a panel resistance according to the position in the display panel based on the panel temperature, to calculate a voltage drop according to the position in the display panel based on the block current and the panel resistance and to compensate the input image data based on the voltage drop to generate a data signal. The data driver is configured to convert the data signal to a data voltage and to output the data voltage to the display panel.

In an embodiment, the driving controller may include a first current determiner configured to receive the input image data to calculate a first block current of the display block and a second current determiner configured to compensate the first block current based on the panel temperature to determine a second block current.

In an embodiment, the first block current is determined independent of the panel temperature. A difference between the first block current and the second block current may be proportional to a square root of the panel temperature.

In an embodiment, the driving controller may further include a temperature predictor configured to predict the panel temperature. The temperature predictor may include a current accumulator configured to accumulate the first block current to generate an accumulated block current and a temperature calculator configured to calculate the panel temperature based on the accumulated block current and a thermal conductivity of the display panel.

In an embodiment, the temperature predictor may further include a filter configured to operate a time filtering on the panel temperature calculated by the temperature calculator using a time constant.

In an embodiment, the driving controller may further include a panel resistance determiner configured to receive the panel temperature from the temperature predictor, to calculate the panel resistance according to the position in the display panel based on the panel temperature.

In an embodiment, the panel resistance may be proportional to a change amount of the panel temperature.

In an embodiment, the driving controller may further include a voltage drop determiner configured to receive the second block current from the second current determiner, to receive the panel resistance from the panel resistance determiner and to calculate the voltage drop according to the position in the display panel based on the second block current and the panel resistance.

In an embodiment, the driving controller may further include a third current determiner configured to receive compensated image data compensated based on the voltage drop, to receive the panel temperature and to calculate a third block current of the display block based on the panel temperature.

In an embodiment, the driving controller may further include a second voltage drop determiner configured to receive the third block current from the third current determiner, to receive the panel resistance from the panel resistance determiner, and to calculate a second voltage drop according to the position in the display panel based on the third block current and the panel resistance.

In an embodiment, the display apparatus may further include a current sensor configured to sense a global current of the display panel. The second current determiner may be configured to compensate the first block current based on the panel temperature and the global current to determine the second block current.

In an embodiment, the driving controller may include a gamma converter configured to apply a gamma value to a grayscale value of the input image data to generate a gamma grayscale value, a compensation value generator configured to generate a compensation value based on the voltage drop, a grayscale value compensator configured to operate the gamma grayscale value and the compensation value to generate a compensated grayscale value and a degamma converter configured to operate a degamma conversion on the compensated grayscale value using the gamma value.

In an embodiment of a display apparatus according to the present inventive concept, the display apparatus includes a display panel, a temperature sensor, a driving controller and a data driver. The temperature sensor is configured to determine a sensed temperature. The driving controller is configured to predict a panel temperature according to a position in the display panel based on input image data and the sensed temperature, to calculate a block current of a display block of the display panel and a panel resistance according to the position in the display panel based on the panel temperature, to calculate a voltage drop according to the position in the display panel based on the block current and the panel resistance and to compensate the input image data based on the voltage drop to generate a data signal. The data driver is configured to convert the data signal to a data voltage and to output the data voltage to the display panel.

In an embodiment, the driving controller may include a first current determiner configured to receive the input image data and to calculate a first block current of the display block and a second current determiner configured to compensate the first block current based on the panel temperature to determine a second block current.

In an embodiment, the driving controller may further include a temperature predictor configured to predict the panel temperature. The temperature predictor may include a current accumulator configured to accumulate the first block current to generate an accumulated block current and a temperature calculator configured to calculate the panel temperature based on the accumulated block current, a thermal conductivity of the display panel and the sensed temperature.

In an embodiment of a method of driving a display apparatus according to the present inventive concept, the method includes predicting a panel temperature according to a position in a display panel based on input image data, calculating a block current of a display block of the display panel based on the panel temperature, calculating a panel resistance according to the position in the display panel based on the panel temperature, calculating a voltage drop according to the position in the display panel based on the block current and the panel resistance, compensating the input image data based on the voltage drop to generate a data signal, converting the data signal to a data voltage and outputting the data voltage to the display panel.

In an embodiment, the calculating a block current of a display block may include calculating a first block current of the display block based on the input image data and compensating the first block current based on the panel temperature to determine a second block current. The predicting a panel temperature may include accumulating the first block current to generate an accumulated block current and calculating the panel temperature based on the accumulated block current and a thermal conductivity of the display panel.

In an embodiment, the calculating a voltage drop may include calculating the voltage drop according to the position in the display panel based on the second block current and the panel resistance. The method may further include calculating a third block current of the display block based on the panel temperature and compensated image data which are compensated based on the voltage drop and calculating a second voltage drop according to the position in the display panel based on the third block current and the panel resistance.

In an embodiment of a display apparatus according to the present inventive concept, the display apparatus includes a display panel, a driving controller and a data driver. The driving controller is configured to predict a panel temperature according to a position in the display panel based on input image data and to compensate the input image data to generate a data signal such that grayscale data for outputting a same luminance are different according to the position in the display panel. The data driver is configured to convert the data signal to a data voltage and to output the data voltage to the display panel.

In an embodiment, the panel temperature according to the position in the display panel may be predicted based on a first block current of the input image data. The driving controller may be configured to compensate the first block current based on the panel temperature to generate a second block current. The driving controller may be configured to calculate a panel resistance based on the panel temperature. The driving controller may be configured to calculate a voltage drop based on the second block current and the panel resistance. The compensate of the input image data may be performed using the calculated voltage drop.

According to at least embodiment of the display apparatus and the method of driving the display apparatus, the panel temperature according to the position in the display panel may be predicted based on the input image data, the block current of the display block of the display panel and the panel resistance according to the position in the display panel may be calculated based on the panel temperature, the voltage drop according to the position in the display panel may be calculated based on the block current and the panel resistance and the input image data may be compensated based on the voltage drop. Accordingly, the luminance change according to the position in the display panel may be accurately compensated. Thus, the display quality of the display panel may be enhanced.

BRIEF DESCRIPTION OF THE DRAWINGS

The above and other features of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
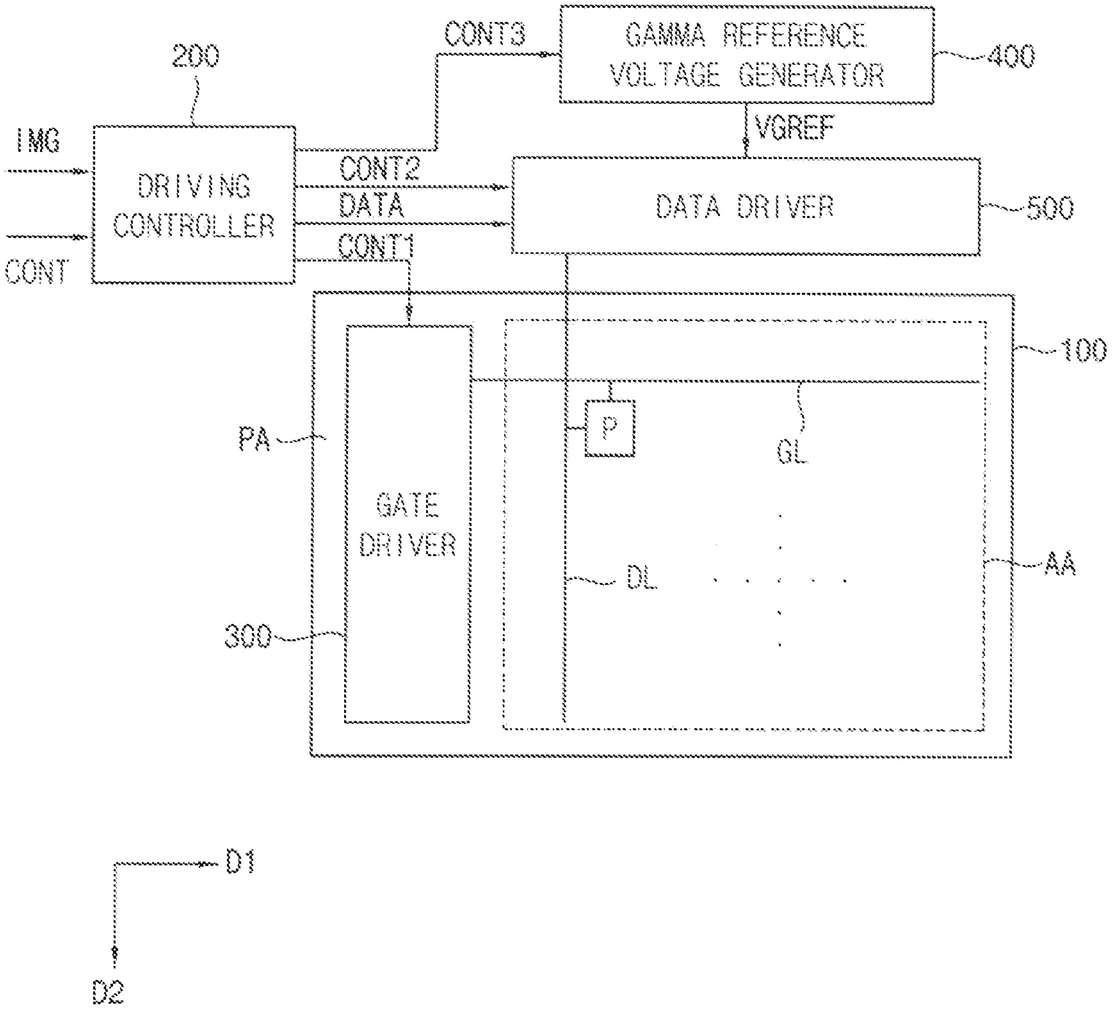
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver (e.g., driver circuit). The display panel driver includes a driving controller 200 (e.g., a control circuit), a gate driver 300 (e.g., driver circuit), a gamma reference voltage generator 400 and a data driver 500 (e.g., a driver circuit).

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be referred to as a timing controller embedded data driver (TED).

The display panel 100 has a display region AA on which an image is displayed and a peripheral region PA adjacent to the display region AA. In an embodiment, no image is displayed in the peripheral region PA.

The display panel 100 includes a plurality of gate lines GL, a plurality of data lines DL and a plurality of pixels P connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be integrated on the peripheral region PA of the display panel 100. For example, the gate driver 300 may be mounted on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding or contributing to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL. For example, the data driver 500 may be integrated on the peripheral region PA of the display panel 100. For example, the data driver 500 may be mounted on the peripheral region PA of the display panel 100.

Figure 2:
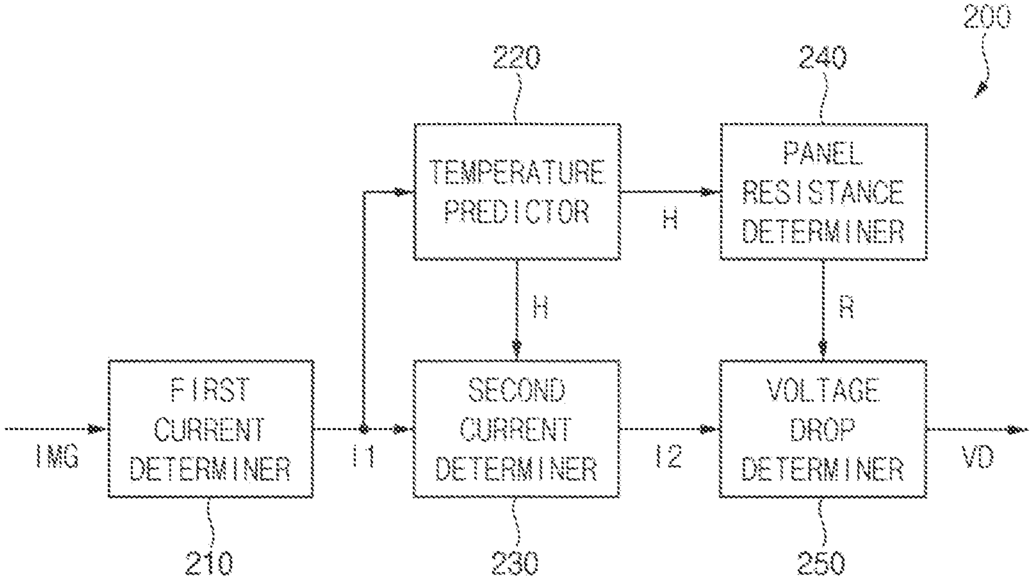
FIG. 2 is a block diagram illustrating a driving controller of FIG. 1.
Figure 3:
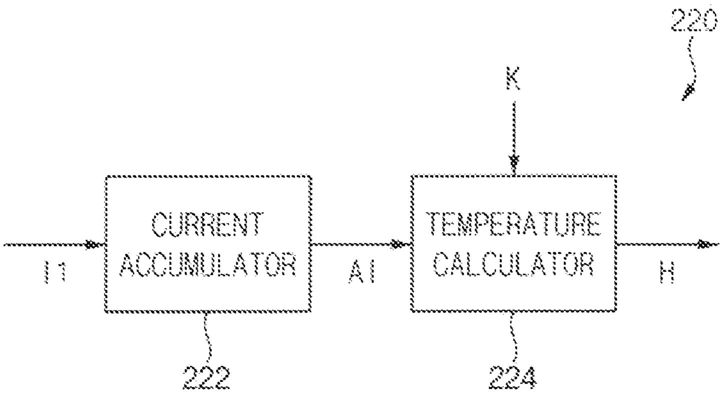
FIG. 3 is a block diagram illustrating a temperature predictor of FIG. 2.

FIG. 2 is a block diagram illustrating the driving controller 200 of FIG. 1 according to an embodiment. FIG. 3 is a block diagram illustrating a temperature predictor 220 (e.g., a predictor circuit) of FIG. 2 according to an embodiment.

Referring to FIGS. 1 to 3, the driving controller 200 may predict a panel temperature H according to a position in the display panel 100 based on input image data IMG, calculate a block current I2 of a given display block of the display panel 100 and a panel resistance R according to the position in the display panel based on the panel temperature H, calculate a voltage drop VD according to the position in the display panel 100 based on the block current I2 and the panel resistance R and compensate the input image data IMG based on the voltage drop VD to generate the data signal DATA. For example, the display region AA may be divided into a plurality of display blocks where the given display block is one of the display blocks. The given display block may correspond to one of the display blocks having the position.

For example, the driving controller 200 may include a first current determiner 210 (e.g., a current sensor), a temperature predictor 220 (e.g., predictor circuit), a second current determiner 230 (e.g., a determiner circuit), a panel resistance determiner 240 (e.g., a determiner circuit) and a voltage drop determiner 250 (e.g., a determiner circuit).

The first current determiner 210 may receive the input image data IMG and may calculate a first block current I1 of the display block of the display panel 100. The first current determiner 210 may output the first block current I1 to the temperature predictor 220 and the second current determiner 230. The first current determiner 210 may calculate the first block current I1 from the input image data IMG.

The display block may mean one unit area when the display panel 100 is divided into a predetermined size. A shape of the display block may be a rectangle or a square. For example, the display block may include a plurality of pixels.

The first current determiner 210 may calculate the first block current I1 of each of the display blocks. In an embodiment, the first current determiner 210 sum grayscale values of the input image data IMG corresponding to the display block to calculate the first block current I1 of the display block. For example, each of the grayscale values may correspond to a grayscale value of a corresponding pixel among pixels of the display block.

The temperature predictor 220 may receive the first block current I1 and may predict the panel temperature H. For example, the temperature predictor 220 may predict the panel temperature H from the first block current I1. The temperature predictor 220 may output the panel temperature H to the second current determiner 230 and the panel resistance determiner 240.

In an embodiment, a temperature H and a current I1 of a display block of the display panel 100 is determined from a portion of input image data IMG corresponding to the display block, the current I1 is compensated by the temperature H to generated compensated current I2, a resistance R of the display block is determined from the temperature H, a voltage drop VD is determined from the resistance R and the compensated current I2, and the image data IMG of the display block is compensated using the resistance R and the compensated current I2. This process may repeat for all remaining display blocks of the 100.

As shown in FIG. 3, the temperature predictor 220 may include a current accumulator 222 (e.g., a logic circuit) accumulating the first block current I1 to generate an accumulated block current AI and a temperature calculator 224 (e.g., a logic circuit) calculating the panel temperature H based on the accumulated block current AI and a thermal conductivity K of the display panel 100. For example, the current accumulator 222 could average a number of the accumulated block currents I1 received for a given block over a period of time to generate the accumulated block current AI. For example, when the accumulated block current AI is relatively high, the panel temperature H may be relatively high. For example, the panel temperature H may be proportional to the accumulated block current AI. For example, when the thermal conductivity K is relatively high, the panel temperature H may be relatively low. For example, the panel temperature H may be inversely proportional to the thermal conductivity K.

When the panel temperature H is calculated using the first block current I1 of one frame and an image of the input image data IMG greatly changes for each frame, the panel temperature H may be determined to be greatly changed. However, although the image of the input image data IMG greatly changes for each frame, the panel temperature H may be gradually changed. Thus, the current accumulator 222 may accumulate the first block current I1 for a predetermined number of frames and may generate the accumulated block current AI by averaging the accumulated first block currents I1. When the panel temperature H is calculated using the accumulated block current AI, the panel temperature H may be determined to be gradually changed although the image of the input image data IMG greatly changes for each frame.

The second current determiner 230 may receive the first block current I1 from the first current determiner 210. The second current determiner 230 may receive the panel temperature H from the temperature predictor 220.

The second current determiner 230 may compensate the first block current I1 based on the panel temperature H to determine a second block current I2. The second current determiner 230 may output the second block current I2 to the voltage drop determiner 250.

Herein, the first block current I1 is determined regardless of the panel temperature H. In an embodiment, the first block current I1 is determined using a grayscale value of the input image data IMG. The second block current I2 may be determined by reflecting the panel temperature H to the first block current I1. For example, a difference between the first block current I1 and the second block current I2 may be proportional to a square root of the panel temperature H.

Like the first current determiner 210, the second current determiner 230 may calculate the second block current I2 of each of the display blocks. The display block used in the first current determiner 210 may be same as the display block used in the second current determiner 230.

The panel resistance determiner 240 may receive the panel temperature H from the temperature predictor 220. The panel resistance determiner 240 may calculate the panel resistance R according to the position in the display panel 100 based on the panel temperature H. The panel resistance determiner 240 may output the panel resistance R to the voltage drop determiner 250. The panel resistance determiner 240 may store an initial resistance according to the position in the display panel 100, and may compensate the initial resistance using the panel temperature H to calculate the panel resistance R. The position in the display panel 100 may correspond to a position of a display block currently being operated on. For example, if a first temperature is calculated based on a block current of a first display block, the initial resistance of the first display block may be compensated by the first temperature to generate a compensated resistance. For example, the panel resistance R may be proportional to a change amount of the panel temperature H.

The voltage drop determiner 250 may receive the second block current I2 from the second current determiner 230 and may receive the panel resistance R from the panel resistance determiner 240. The second block current I2 is a value compensated by reflecting the factor of the panel temperature H to the first block current I1 which is calculated using only the input image data IMG. The panel resistance R is a value compensated by reflecting the factor of the panel temperature H to the initial resistance of the display panel 100.

The voltage drop determiner 250 may calculate the voltage drop VD according to the position in the display panel 100 based on the second block current I2 and the panel resistance R. The voltage drop VD may be an IR drop (a current-resistance drop). The voltage drop VD may be determined as a multiplication of the second block current I2 and the panel resistance R. For example, the voltage drop determiner 250 may receive a value the compensated resistance of the first display block and a value of the second block current I2 of the first display block, and then multiple the received values to determine the voltage drop VD of the first display block.

For example, when the voltage drop VD is not generated at a specific position in the display panel 100, the specific position of the display panel 100 may represent a desired luminance. When the voltage drop VD at a specific position in the display panel 100 is less than a first predetermined value, the specific position of the display panel 100 may represent a luminance slightly lower than a desired luminance. When the voltage drop VD at a specific position in the display panel 100 is greater than a second predetermined value, the specific position of the display panel 100 may represent a luminance significantly lower than a desired luminance.

In the present embodiment, at each position in the display panel 100, the panel temperature H of the display panel 100 may be changed according to the accumulated data amount of the input image data IMG. The driving controller 200 may compensate the input image data IMG based on a predicted value of a change amount of the panel temperature H. Accordingly, grayscale data for outputting the same luminance may be different according to the position in the display panel 100.

The driving controller 200 may predict the panel temperature 100 according to the position in the display panel 100 based on the input image data IMG and may compensate the input image data IMG to generate the data signal DATA such that the grayscale data for outputting the same luminance are different according to the position in the display panel 100.

The panel temperature H according to the position in the display panel 100 may be predicted based on the first block current I1 of the input image data IMG.

The driving controller 200 may compensate the first block current I1 based on the panel temperature H to generate the second block current I2. The driving controller 200 may calculate the panel resistance R based on the panel temperature H.

The driving controller 200 may calculate the voltage drop VD based on the second block current I2 and the panel resistance R. The driving controller 200 may generate the data signal DATA based on the voltage drop VD.

Figure 4:
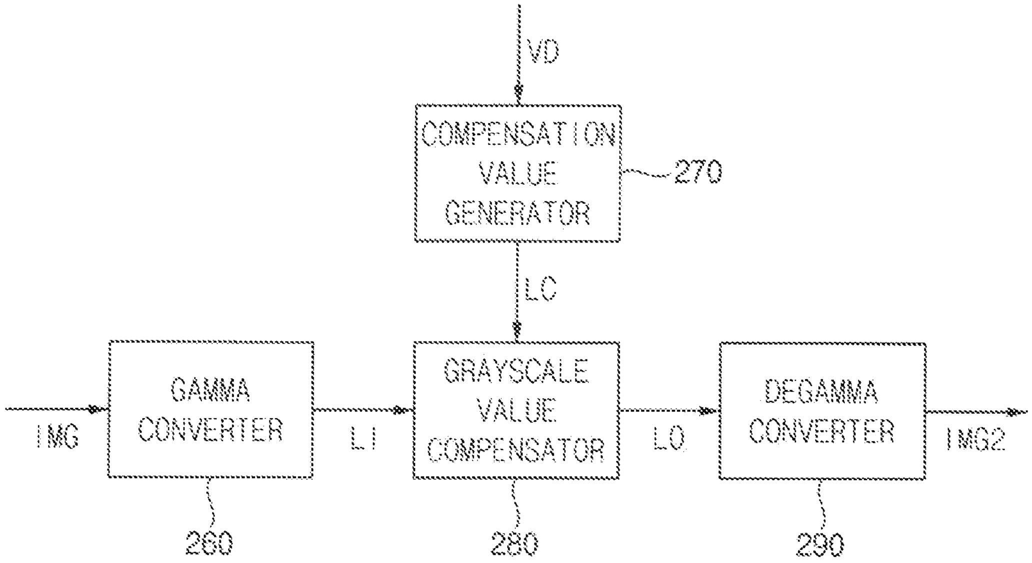
FIG. 4 is a block diagram illustrating a driving controller of FIG. 1.

FIG. 4 is a block diagram illustrating the driving controller 200 of FIG. 1 according to an embodiment.

Referring to FIGS. 1 to 4, the driving controller 200 may further include a gamma converter 260 (e.g., a logic circuit), a compensation value generator 270 (e.g., a logic circuit), a grayscale value compensator 280 (e.g., a logic circuit) and a degamma converter 290 (e.g., a logic circuit). Thus, in addition to components 210, 220, 230, 240, and 250, the driving controller of FIG. 3 may additionally include components 260, 270, 280, and 290.

The gamma converter 260 may apply a gamma value to a grayscale value of the input image data IMG to generate a gamma grayscale value LI. A domain of the input image data IMG may be converted from a grayscale domain to a luminance domain by the gamma converter 260. The gamma grayscale value LI may be referred to an input luminance LI.

The compensation value generator 270 may receive the voltage drop VD from the voltage drop determiner 250. The compensation value generator 270 may generate a compensation value LC based on the voltage drop VD.

The grayscale value compensator 280 may operate on the gamma grayscale value LI and the compensation value LC to generate a compensated grayscale value LO. The compensated grayscale value LO may be referred to an output luminance.

The degamma converter 290 may operate a degamma conversion on the compensated grayscale value LO using the gamma value. A domain of the compensated grayscale value LO may be converted from the luminance domain to the grayscale domain by the degamma converter 290. The degamma conversion is operated on the compensated grayscale value LO so that compensated image data IMG2 may be generated.

According to the present embodiment, the panel temperature H according to the position in the display panel 100 may be predicted based on the input image data IMG, the block current I2 of the display block of the display panel 100 and the panel resistance R according to the position in the display panel 100 may be calculated based on the panel temperature H, the voltage drop VD according to the position in the display panel 100 may be calculated based on the block current I2 and the panel resistance R and the input image data IMG may be compensated based on the voltage drop VD. Accordingly, a luminance change according to the position in the display panel 100 may be accurately compensated. Thus, the display quality of the display panel 100 may be enhanced.

Figure 5:
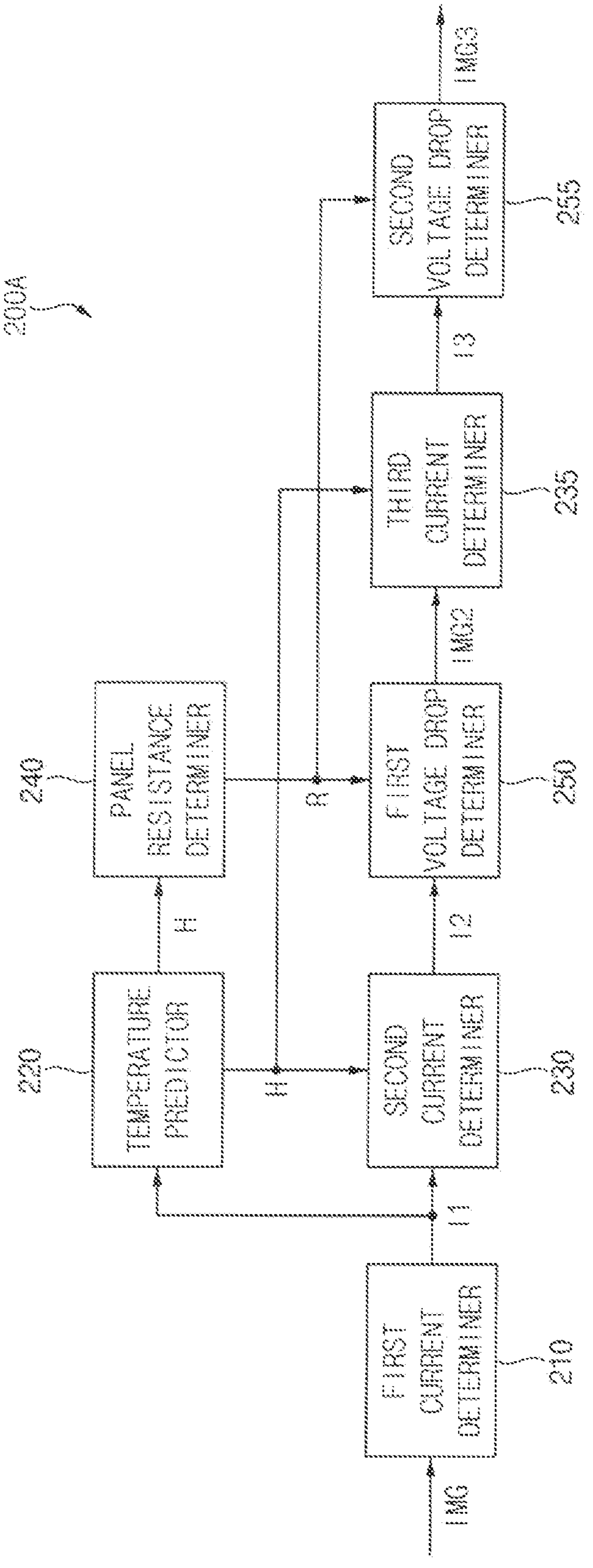
FIG. 5 is a block diagram illustrating a driving controller of a display apparatus according to an embodiment of the present inventive concept.

FIG. 5 is a block diagram illustrating a driving controller 200A of a display apparatus according to an embodiment of the present inventive concept. The driving controller 200 of FIG. 1 may be implemented by the driving controller 200A.

The display apparatus and the method of driving the display apparatus according to the present embodiment is substantially the same as the display apparatus and the method of driving the display apparatus of the previous embodiment explained referring to FIGS. 1 to 4 except for the structure of the driving controller. Thus, the same reference numerals will be used to refer to the same or like parts as those described in the previous embodiment of FIGS. 1 to 4 and any repetitive explanation concerning the above elements will be omitted.

Referring to FIGS. 1 and 3 to 5, the display apparatus includes a display panel 100 and a display panel driver. The display panel driver includes a driving controller 200A, a gate driver 300, a gamma reference voltage generator 400 and a data driver 500.

The driving controller 200A may predict a panel temperature H according to a position in the display panel 100 based on input image data IMG, calculate a block current I2 of a display block of the display panel 100 and a panel resistance R according to the position in the display panel based on the panel temperature H, calculate a voltage drop according to the position in the display panel 100 based on the block current I2 and the panel resistance R and compensate the input image data IMG based on the voltage drop to generate the data signal DATA. For example, the data signal DATA may be the compensated image data IMG3 output by the second voltage drop determiner 255 or generated based on the compensated image data IMG3.

For example, the driving controller 200A may include a first current determiner 210, a temperature predictor 220, a second current determiner 230, a panel resistance determiner 240 and a first voltage drop determiner 250. In the present embodiment, the driving controller 200A may further include a third current determiner 235 (e.g., a determiner circuit) and a second voltage drop determiner 255 (e.g., a determiner circuit).

The first current determiner 210 may receive the input image data IMG and may calculate a first block current I1 of the display block of the display panel 100 based on the received input image data IMG. The first current determiner 210 may output the first block current I1 to the temperature predictor 220 and the second current determiner 230.

The temperature predictor 220 may receive the first block current I1 and may predict the panel temperature H based on the received first block current I1. The temperature predictor 220 may output the panel temperature H to the second current determiner 230 and the panel resistance determiner 240.

The second current determiner 230 may receive the first block current I1 from the first current determiner 210. The second current determiner 230 may receive the panel temperature H from the temperature predictor 220. The second current determiner 230 may compensate the first block current I1 based on the panel temperature H to determine a second block current I2. The second current determiner 230 may output the second block current I2 to the first voltage drop determiner 250.

The panel resistance determiner 240 may receive the panel temperature H from the temperature predictor 220. The panel resistance determiner 240 may calculate the panel resistance R according to the position in the display panel 100 based on the panel temperature H. The panel resistance determiner 240 may output the panel resistance R to the first voltage drop determiner 250.

The first voltage drop determiner 250 may receive the second block current I2 from the second current determiner 230 and may receive the panel resistance R from the panel resistance determiner 240. The first voltage drop determiner 250 may calculate a first voltage drop according to the position in the display panel 100 based on the second block current I2 and the panel resistance R.

The input image data IMG may be compensated based on the first voltage drop calculated by the first voltage drop determiner 250 so that a compensated image data IMG2 may be generated. In FIG. 5, a method of generating the compensated image data IMG2 is not illustrated. FIG. 5 illustrates that the first voltage drop determiner 250 operate both an operation of calculating the first voltage drop and an operation of compensating the input image data IMG using the first voltage drop. The method of generating the compensated image data IMG2 may be substantially the same as the method explained referring to FIG. 4.

In the present embodiment, the driving controller 200A may further include the third current determiner 235 and the second voltage drop determiner 255.

The third current determiner 235 may receive the compensated image data IMG2 which is compensated based on the first voltage drop and may receive the panel temperature H. The third current determiner 235 may calculate a third block current I3 of the display block based on the panel temperature. Herein, the panel temperature H may be calculated based on the first block current I1. Alternatively, the panel temperature H may be recalculated using the second block current I2 or a block current generated based on only grayscale values of the compensated image data IMG2.

The second voltage drop determiner 255 may receive the third block current I3 from the third current determiner 235 and may receive the panel resistance R from the panel resistance determiner 240. The second voltage drop determiner 255 may calculate a second voltage drop according to the position in the display panel 100 based on the third block current I3 and the panel resistance R. In FIG. 5, a method of generating re-compensated image data IMG3 is not illustrated. FIG. 5 illustrates that the second voltage drop determiner 255 operates both an operation of calculating the second voltage drop and an operation of compensating the compensated input image data IMG2 using the second voltage drop to generate the re-compensated image data IMG3. The method of generating the re-compensated image data IMG3 may be substantially the same as the method explained referring to FIG. 4.

In the present embodiment, the input image data IMG is compensated using the first voltage drop determined by the first voltage drop determiner 250 to generate the compensated image data IMG2 and the compensated image data IMG2 may be compensated again by the third current determiner 235 and the second voltage drop determiner 255. In the present embodiment, the driving controller 200A further includes the third current determiner 235 and the second voltage drop determiner 255 so that an accuracy of the voltage drop may be enhanced.

According to the present embodiment, the panel temperature H according to the position in the display panel 100 may be predicted based on the input image data IMG, the block current I2 of the display block of the display panel 100 and the panel resistance R according to the position in the display panel 100 may be calculated based on the panel temperature H, the voltage drop according to the position in the display panel 100 may be calculated based on the block current I2 and the panel resistance R and the input image data IMG may be compensated based on the voltage drop. Accordingly, the luminance change according to the position in the display panel 100 may be accurately compensated. Thus, the display quality of the display panel 100 may be enhanced.

Figure 6:
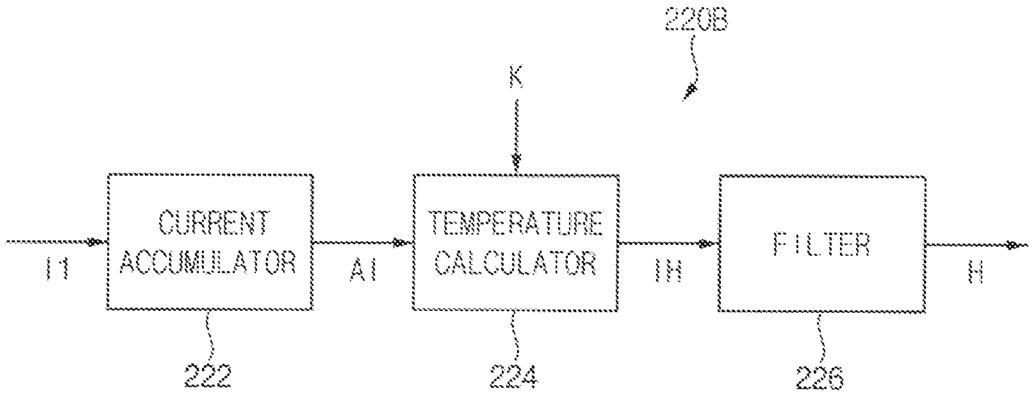
FIG. 6 is a block diagram illustrating a temperature predictor of a driving controller of a display apparatus according to an embodiment of the present inventive concept.

FIG. 6 is a block diagram illustrating a temperature predictor 220B of a driving controller 200 of a display apparatus according to an embodiment of the present inventive concept. The temperature predictor 220 of FIG. 2 or FIG. 5 may be implemented using the temperature predictor 220B.

The display apparatus and the method of driving the display apparatus according to the present embodiment is substantially the same as the display apparatus and the method of driving the display apparatus of the previous embodiment explained referring to FIGS. 1 to 4 except for the structure of the temperature predictor of the driving controller. Thus, the same reference numerals will be used to refer to the same or like parts as those described in the previous embodiment of FIGS. 1 to 4 and any repetitive explanation concerning the above elements will be omitted.

Referring to FIGS. 1, 2, 4 and 6, the display apparatus includes a display panel 100 and a display panel driver. The display panel driver includes a driving controller 200, a gate driver 300, a gamma reference voltage generator 400 and a data driver 500.

The driving controller 200 may predict a panel temperature H according to a position in the display panel 100 based on input image data IMG, calculate a block current I2 of a display block of the display panel 100 and a panel resistance R according to the position in the display panel based on the panel temperature H, calculate a voltage drop VD according to the position in the display panel 100 based on the block current I2 and the panel resistance R and compensate the input image data IMG based on the voltage drop VD to generate the data signal DATA.

For example, the driving controller 200 may include a first current determiner 210, a temperature predictor 220B, a second current determiner 230, a panel resistance determiner 240 and a voltage drop determiner 250.

The first current determiner 210 may receive the input image data IMG and may calculate a first block current I1 of the display block of the display panel 100. The first current determiner 210 may output the first block current I1 to the temperature predictor 220B and the second current determiner 230.

The temperature predictor 220B may receive the first block current I1 and may predict the panel temperature H from the received first block current I1. The temperature predictor 220B may output the panel temperature H to the second current determiner 230 and the panel resistance determiner 240.

The temperature predictor 220B may include a current accumulator 222 accumulating the first block current I1 to generate an accumulated block current AI, a temperature calculator 224 calculating an initial panel temperature IH based on the accumulated block current AI and a thermal conductivity K of the display panel 100 and a filter 226 operating a time filtering on the initial panel temperature IH calculated by the temperature calculator 224 using a time constant. For example, the current accumulator 222 could average a number of the accumulated block currents I1 received for a given block over a period of time to generate the accumulated block current AI. For example, when the accumulated block current AI is relatively high, the panel temperature H may be relatively high. For example, the panel temperature H may be proportional to the accumulated block current AI. For example, when the thermal conductivity K is relatively high, the panel temperature H may be relatively low. For example, the panel temperature H may be inversely proportional to the thermal conductivity K. In an embodiment, the time filtering is performed using a linear continuous-time filter. Alternatively, the filter 226 may be a median filter. For example, the filter 226 may apply a time delay to the initial panel temperature IH to generate the panel temperature H. According to an embodiment, when the initial panel temperature IH generated by the temperature calculator 224 being time-filtered using an appropriate time constant, an accuracy of the luminance compensation may be enhanced compared to the luminance compensation using the initial panel temperature IH. For example, the current accumulator 222 may average together block currents received over a period of time for a given display block to generate a first block current I1 for the given display block.

According to the present embodiment, the panel temperature H according to the position in the display panel 100 may be predicted based on the input image data IMG, the block current I2 of the display block of the display panel 100 and the panel resistance R according to the position in the display panel 100 may be calculated based on the panel temperature H, the voltage drop VD according to the position in the display panel 100 may be calculated based on the block current I2 and the panel resistance R and the input image data IMG may be compensated based on the voltage drop VD. Accordingly, the luminance change according to the position in the display panel 100 may be accurately compensated. Thus, the display quality of the display panel 100 may be enhanced.

Figure 7:
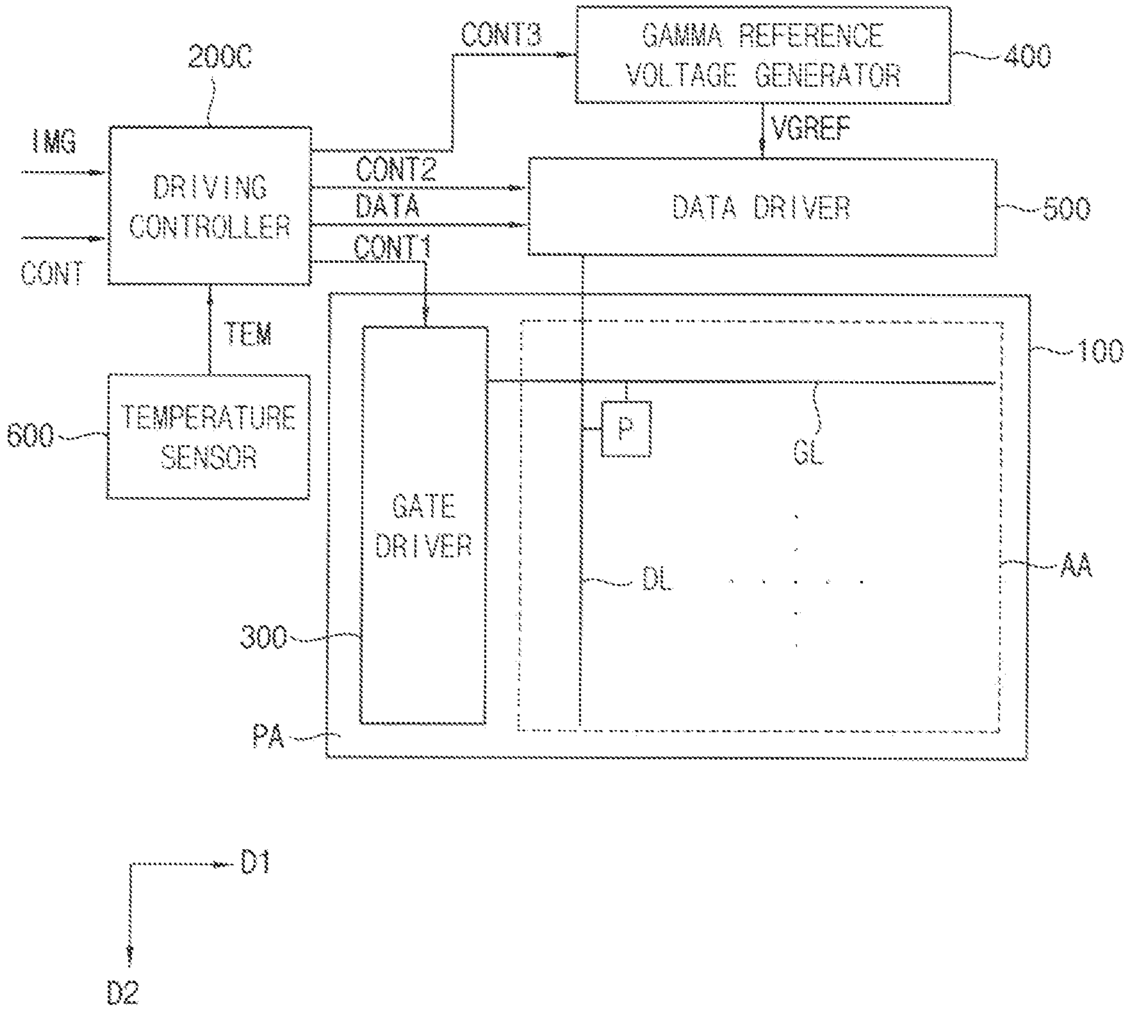
FIG. 7 is a block diagram illustrating a display apparatus according to an embodiment of the present inventive concept.
Figure 8:
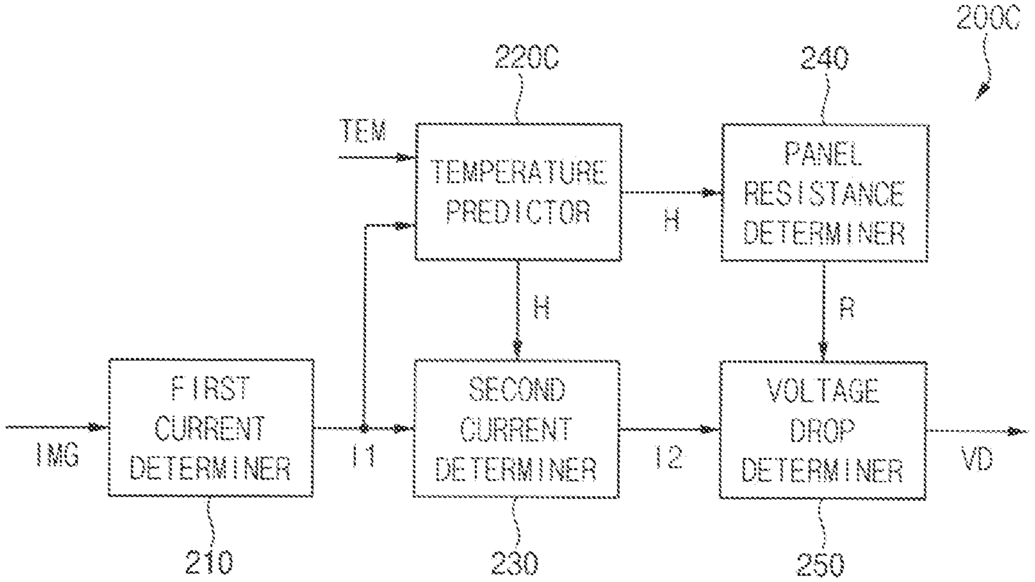
FIG. 8 is a block diagram illustrating a driving controller of FIG. 7.
Figure 9:
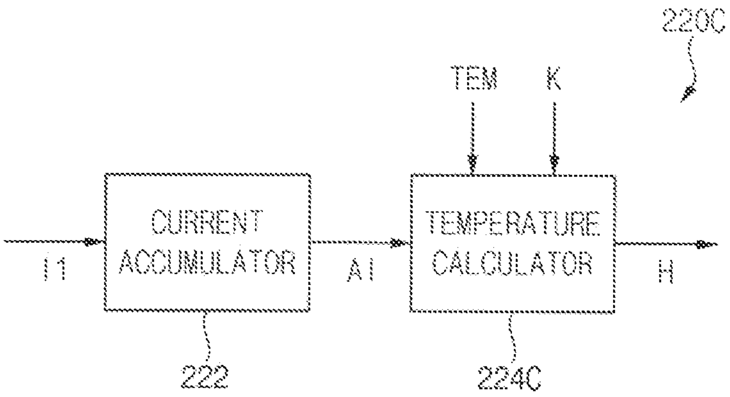
FIG. 9 is a block diagram illustrating a temperature predictor of FIG. 8.

FIG. 7 is a block diagram illustrating a display apparatus according to an embodiment of the present inventive concept. FIG. 8 is a block diagram illustrating a driving controller 200C of FIG. 7. FIG. 9 is a block diagram illustrating a temperature predictor 220C of FIG. 8.

The display apparatus and the method of driving the display apparatus according to the present embodiment is substantially the same as the display apparatus and the method of driving the display apparatus of the previous embodiment explained referring to FIGS. 1 to 4 except that the display apparatus further includes a temperature sensor. Thus, the same reference numerals will be used to refer to the same or like parts as those described in the previous embodiment of FIGS. 1 to 4 and any repetitive explanation concerning the above elements will be omitted.

Referring to FIGS. 4 and 7 to 9, the display apparatus includes a display panel 100 and a display panel driver. The display panel driver includes a driving controller 200C, a gate driver 300, a gamma reference voltage generator 400 and a data driver 500. The display apparatus may further include a temperature sensor 600.

The temperature sensor 600 may determine a sensed temperature TEM. For example, the temperature sensor 600 may be disposed in the driving controller 200C or outside of the driving controller 200C. For example, the temperature sensor 600 may be disposed on the display panel or outside of the display panel 100.

The driving controller 200C may predict a panel temperature H according to a position in the display panel 100 based on input image data IMG and the sensed temperature TEM, calculate a block current I2 of a display block of the display panel 100 and a panel resistance R according to the position in the display panel based on the panel temperature H, calculate a voltage drop VD according to the position in the display panel 100 based on the block current I2 and the panel resistance R and compensate the input image data IMG based on the voltage drop VD to generate the data signal DATA.

For example, the driving controller 200C may include a first current determiner 210, a temperature predictor 220C, a second current determiner 230, a panel resistance determiner 240 and a voltage drop determiner 250. Although not shown in FIG. 8, the driving controller 200C may further include a third current determiner 235 and a second voltage drop determiner 255 as explained referring to FIG. 5.

The first current determiner 210 may receive the input image data IMG and may calculate a first block current I1 of a display block of the display panel 100 using the received input image data IMG. The first current determiner 210 may output the first block current I1 (e.g., a value that indicates a certain current) to the temperature predictor 220C and the second current determiner 230.

The temperature predictor 220C may receive the first block current I1 and the sensed temperature TEM to predict the panel temperature H. The temperature predictor 220C may output the panel temperature H to the second current determiner 230 and the panel resistance determiner 240.

The temperature predictor 220C may include a current accumulator 222 accumulating the first block current I1 to generate an accumulated block current AI and a temperature calculator 224C calculating the panel temperature H based on the accumulated block current AI, a thermal conductivity K of the display panel 100 and the sensed temperature TEM.

In the present embodiment, the panel temperature H may be predicted using both the sensed temperature TEM and a temperature predicting value generated based on the grayscale value of the input image data IMG so that an accuracy of the temperature prediction may be enhanced. For example, the temperature predicting value may be generated based on the accumulated block current AI and the thermal conductivity K of the display panel 100. For example, the panel temperature H may be determined by adding the sensed temperature TEM and the temperature predicting value. For example, the panel temperature H may be determined by a weighted sum of the sensed temperature TEM and the temperature predicting value.

According to the present embodiment, the panel temperature H according to the position in the display panel 100 may be predicted based on the input image data IMG and the sensed temperature TEM, the block current I2 of the display block of the display panel 100 and the panel resistance R according to the position in the display panel 100 may be calculated based on the panel temperature H, the voltage drop VD according to the position in the display panel 100 may be calculated based on the block current I2 and the panel resistance R and the input image data IMG may be compensated based on the voltage drop VD. Accordingly, the luminance change according to the position in the display panel 100 may be accurately compensated. Thus, the display quality of the display panel 100 may be enhanced.

Figure 10:
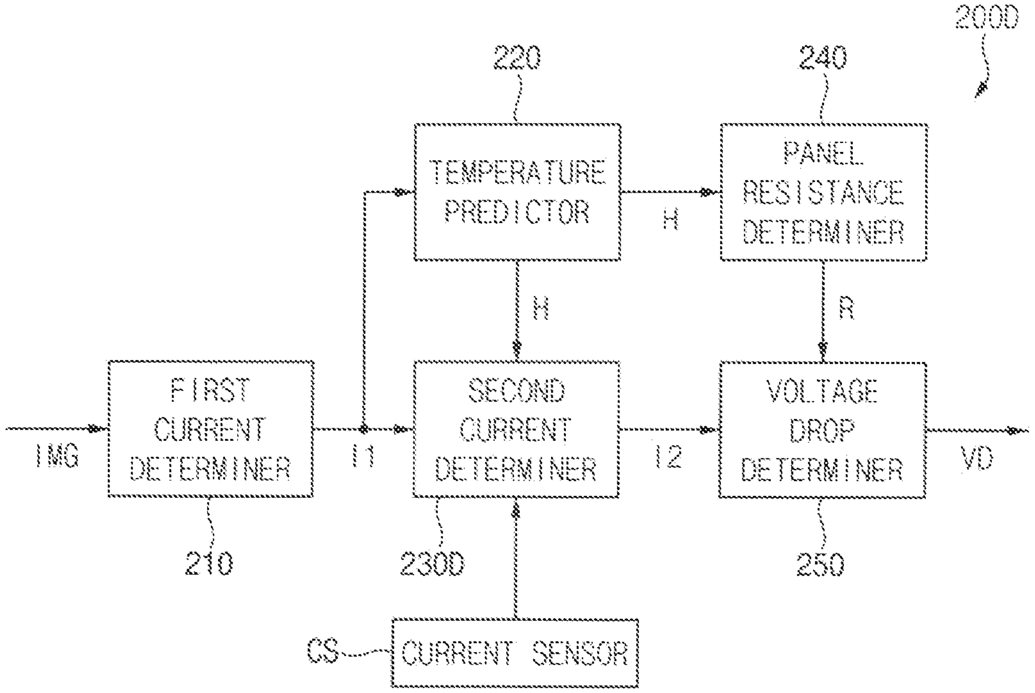
FIG. 10 is a block diagram illustrating a driving controller of a display apparatus according to an embodiment of the present inventive concept.

FIG. 10 is a block diagram illustrating a driving controller 200D of a display apparatus according to an embodiment of the present inventive concept. The driving controller 200 of FIG. 1 may be implemented using the driving controller 200D.

The display apparatus and the method of driving the display apparatus according to the present embodiment is substantially the same as the display apparatus and the method of driving the display apparatus of the previous embodiment explained referring to FIGS. 1 to 4 except that the display apparatus further includes a current sensor. Thus, the same reference numerals will be used to refer to the same or like parts as those described in the previous embodiment of FIGS. 1 to 4 and any repetitive explanation concerning the above elements will be omitted.

Referring to FIGS. 1, 3, 4 and 10, the display apparatus includes a display panel 100 and a display panel driver. The display panel driver includes a driving controller 200D, a gate driver 300, a gamma reference voltage generator 400 and a data driver 500. The display apparatus may further include a current sensor CS.

The current sensor CS may sense a global current of the display panel 100 which means a sum of total currents of the display panel 100. For example, the current sensor CS may be disposed in the driving controller 200D. Alternatively, the current sensor CS may be disposed on the display panel 100.

In the present embodiment, the second current determiner 230D may compensate the first block current I1 based on the panel temperature H and the global current to determine the second block current I2. For example, the second current determiner 230D may compare a difference between a predicted total current based on the input image data IMG and the global current so that an accuracy of the second block current I2 may be enhanced. For example, when the predicted total current based on the input image data IMG is greater than the global current, the first block current I1 may be decreased based on a ratio between the predicted total current and the global current to generate the second block current I2. For example, when the predicted total current based on the input image data IMG is less than the global current, the first block current I1 may be increased based on the ratio between the predicted total current and the global current to generate the second block current I2.

According to the present embodiment, the panel temperature H according to the position in the display panel 100 may be predicted based on the input image data IMG, the block current I2 of a display block of the display panel 100 and the panel resistance R according to the position in the display panel 100 may be calculated based on the panel temperature H, the voltage drop VD according to the position in the display panel 100 may be calculated based on the block current I2 and the panel resistance R and the input image data IMG may be compensated based on the voltage drop VD. Accordingly, the luminance change according to the position in the display panel 100 may be accurately compensated. Thus, the display quality of the display panel 100 may be enhanced.

According to the display apparatus and the method of driving the display apparatus according to at least one of the embodiments as explained above, the display quality of the display apparatus may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the present inventive concept. Accordingly, all such modifications are intended to be included within the scope of the present inventive concept as defined in the claims.

What is claimed is:

1. A display apparatus comprising:

a display panel;

a driving controller configured to predict a panel temperature according to a position in the display panel based on input image data and to compensate the input image data corresponding to the panel temperature and a current according to the position in the display panel to generate a data signal;

a data driver configured to convert the data signal to a data voltage and to output the data voltage to the display panel, wherein the current is predicted based on grayscale values of the input image data at the position.

2. The display apparatus of claim 1, wherein the driving controller comprises:

a first current determiner configured to receive the input image data to calculate a first block current of a display block; and a second current determiner configured to compensate the first block current based on the panel temperature to determine a second block current.

3. The display apparatus of claim 2, wherein the first block current is determined independent of the panel temperature, and wherein a difference between the first block current and the second block current is proportional to a square root of the panel temperature.

4. The display apparatus of claim 2, wherein the driving controller further comprises a temperature predictor configured to predict the panel temperature, and wherein the temperature predictor comprises:

a current accumulator configured to accumulate the first block current to generate an accumulated block current; and a temperature calculator configured to calculate the panel temperature based on the accumulated block current and a thermal conductivity of the display panel.

5. The display apparatus of claim 4, wherein the temperature predictor further comprises a filter configured to operate a time filtering on the panel temperature calculated by the temperature calculator using a time constant.

6. The display apparatus of claim 4, wherein the driving controller further comprises a panel resistance determiner configured to receive the panel temperature from the temperature predictor, to calculate a panel resistance according to the position in the display panel based on the panel temperature.

7. The display apparatus of claim 6, wherein the panel resistance is proportional to a change amount of the panel temperature.

8. The display apparatus of claim 6, wherein the driving controller further comprises a voltage drop determiner configured to receive the second block current from the second current determiner, to receive the panel resistance from the panel resistance determiner and to calculate a voltage drop according to the position in the display panel based on the second block current and the panel resistance.

9. The display apparatus of claim 8, wherein the driving controller further comprises a third current determiner configured to receive compensated image data compensated based on the voltage drop, to receive the panel temperature and to calculate a third block current of the display block based on the panel temperature.

10. The display apparatus of claim 9, wherein the driving controller further comprises a second voltage drop determiner configured to receive the third block current from the third current determiner, to receive the panel resistance from the panel resistance determiner, and to calculate a second voltage drop according to the position in the display panel based on the third block current and the panel resistance.

11. The display apparatus of claim 2, further comprising a current sensor configured to sense a global current of the display panel, wherein the second current determiner is configured to compensate the first block current based on the panel temperature and the global current to determine the second block current.

12. The display apparatus of claim 1, wherein the driving controller comprises:

a gamma converter configured to apply a gamma value to a grayscale value of the input image data to generate a gamma grayscale value;

a compensation value generator configured to generate a compensation value based on a voltage drop according to the position in the display panel based on a block current and a panel resistance;

a grayscale value compensator configured to operate on the gamma grayscale value and the compensation value to generate a compensated grayscale value; and a degamma converter configured to operate a degamma conversion on the compensated grayscale value using the gamma value.

13. The display apparatus of claim 1, wherein the current is determined based on a block current of a display block of the display panel.

14. The display apparatus of claim 1, wherein the current is determined based on a panel resistance according to the position in the display panel.

15. A display apparatus comprising:

a display panel;

a temperature sensor configured to determine a sensed temperature;

a driving controller configured to predict a panel temperature according to a position in the display panel based on input image data and the sensed temperature and to compensate the input image data corresponding to the panel temperature and a current according to the position in the display panel to generate a data signal;

a data driver configured to convert the data signal to a data voltage and to output the data voltage to the display panel.

16. The display apparatus of claim 15, wherein the driving controller comprises:

a first current determiner configured to receive the input image data and to calculate a first block current of a display block; and a second current determiner configured to compensate the first block current based on the panel temperature to determine a second block current.

17. The display apparatus of claim 16, wherein the driving controller further comprises a temperature predictor configured to predict the panel temperature, and wherein the temperature predictor comprises:

a current accumulator configured to accumulate the first block current to generate an accumulated block current; and a temperature calculator configured to calculate the panel temperature based on the accumulated block current, a thermal conductivity of the display panel and the sensed temperature.

18. A method of driving a display apparatus, the method comprising:

predicting a panel temperature according to a position in a display panel based on input image data;

compensating the input image data corresponding to the panel temperature and a current according to the position in the display panel to generate a data signal;

converting the data signal to a data voltage; and outputting the data voltage to the display panel, wherein the current is predicted based on grayscale values of the input image data at the position.

19. The method of claim 18, wherein the calculating a block current of a display block comprises:

calculating a first block current of a display block based on the input image data; and compensating the first block current based on the panel temperature to determine a second block current, and wherein the predicting a panel temperature comprises:

accumulating the first block current to generate an accumulated block current; and calculating the panel temperature based on the accumulated block current and a thermal conductivity of the display panel.

20. The method of claim 19, further comprising:

calculating a voltage drop according to the position in the display panel based on the second block current and a panel resistance, calculating a third block current of the display block based on the panel temperature and compensated image data which are compensated based on the voltage drop; and calculating a second voltage drop according to the position in the display panel based on the third block current and the panel resistance.

* * * * *